United States Patent [19]
Subhankar

[11] Patent Number: 6,112,097
[45] Date of Patent: Aug. 29, 2000

[54] LOCATION AREA MANAGEMENT

[75] Inventor: Ray Subhankar, Pland, Tex.

[73] Assignee: Telefonaktiebolaget LM Ericsson, Stockholm, Sweden

[21] Appl. No.: 08/996,479

[22] Filed: Dec. 22, 1997

[30] Foreign Application Priority Data

Dec. 23, 1996 [SE] Sweden .................................. 9604783

[51] Int. Cl.$^7$ ...................................................... H04Q 7/38
[52] U.S. Cl. ........................................... 455/462; 455/446
[58] Field of Search ..................................... 455/426, 462, 455/465, 446, 449, 453, 450; 370/310

[56] References Cited

U.S. PATENT DOCUMENTS

| | | |
|---|---|---|
| 4,759,051 | 7/1988 | Han . |
| 5,577,264 | 11/1996 | Tuohino .................................. 455/432 |
| 5,873,033 | 2/1999 | Hjern et al. ............................. 455/417 |
| 5,878,343 | 3/1999 | Robert et al. ........................... 455/424 |
| 5,898,924 | 4/1999 | Korpi et al. ............................. 455/437 |

FOREIGN PATENT DOCUMENTS

| | | |
|---|---|---|
| 0 637 895 A2 | 2/1999 | European Pat. Off. . |
| WO 96/38013 | 11/1996 | WIPO . |

OTHER PUBLICATIONS

"Radio Equipment and Systems (RES); Digital Enhanced Cordless Telecommunications (DECT); Common Interface (CI); Part 6: Identities and Addressing", ETSI, ETS 300 175–6, Sep. 1996, pp. 1–42.

"Digital Enhanced Cordless Telecommunications (DECT); Common Interface (CI); Part 6: Identities and Addressing", ETSI, ETS 300 175–6, Aug. 1997, pp. 1–5.

*Primary Examiner*—Chi H. Pham
*Assistant Examiner*—Brenda H. Pham
*Attorney, Agent, or Firm*—Burns, Doane, Swecker & Mathis, L.L.P.

[57] ABSTRACT

The present invention relates to a flexible location area management scheme and arrangement for the reducing of signaling in a cordless communications network, which network comprises central control fixed parts (CCFP), each interconnected to radio fixed parts (RFP), particularly in a DECT based PSTN/CTM network. The invention comprises the steps of associating each of the radio fixed parts (RFP) with a radio fixed part identity (RFPI) in such a way that at least to a certain degree neighboring radio fixed parts (RFP) will have radio fixed part identities (RFPI) with consecutive numbers (x . . . x00, x . . . x01, x . . . x10, x . . . x11), defining the location area configuration of the cordless communications network by assigning a location area level (LAL) to each radio fixed part (RFP), and redefining the location area configuration of the cordless communications network by changing the location area level (LAL) to a different level in at least two radio fixed parts (RFP).

21 Claims, 2 Drawing Sheets

LOCATION AREA MANAGEMENT

TECHNICAL FIELD OF THE INVENTION

The present invention relates to a flexible location area management scheme and arrangement for the reducing of signaling in a cordless communications network, particularly in a DECT (Digital Enhanced Cordless Telecommunications) based PSTN/CTM (Public Switched Telephone Network/Cordless Terminal Mobility) network.

DESCRIPTION OF RELATED ART

A DECT network comprises fixed parts interconnected to a local exchange, of which fixed parts each comprises one central control fixed part and several radio fixed parts, see for instance the European Telecommunication Standard "Radio Equipment and Systems (RES); Digital European Cordless Telecommunications (DECT); Common Interface (CI); Part 6: Overview". Each radio fixed part has an identity called radio fixed part identity, which is broadcast to all portable parts, such as mobile phones, which are located within the coverage area of that radio fixed part.

Several radio fixed parts are grouped together in location areas, which are the domains in which a portable part may receive or make a call as a result of a single location registration, i.e., a position update in at least one data base of the network. Each radio fixed part identity contains information of the size of the location area it belongs to in terms of a location area level. According to the European Telecommunication Standard "Radio Equipment and Systems (RES); Digital European Cordless Telecommunications (DECT); Common Interface (CI); Part 6: Identities and addressing" the location area level is specified as n bits of the radio fixed part identity and all radio fixed parts having identical n bits belong to the same location area. Generally, a location area level is specified in such a way that a it covers the domain of one fixed part.

When a portable part is activated and moved across the border between two location areas by a roaming subscriber a location update and sometimes also an authentication have to be performed.

In a crowded environment subscribers may be roaming quite often from one location area to another. In this situation there will be multiple location updates and authentications, i.e., a frequent signaling between the portable parts and the local exchange via the fixed parts. In some situations the increase of network load due to this signaling may not be acceptable.

SUMMARY OF THE INVENTION

The object of the invention is to reduce the signaling, particularly the number of location updates and authentications, in a cordless communications network with a dynamic subscriber behavior, such as a network with varying density of roaming subscribers, and which network comprises fixed parts, each interconnected to radio fixed parts with identities comprising a location area level, particularly in a DECT based PSTN/CTM network.

This is accomplished by a location area management scheme and arrangement, which in a flexible way redefines new location areas, e.g., with multiple fixed parts, when initiated by the service provider or when the signaling situation of the cordless network changes in a predetermined way, e.g., when the number of location updates per unit time and unit area exceeds a predetermined value.

The scheme and arrangement according to the present invention comprises associating each of the radio fixed parts with a radio fixed part identity in such a way that at least to a certain degree neighboring radio fixed parts will have radio fixed part identities with consecutive numbers and redefining the location area configuration of the cordless communications network by changing the location area level to a different level in at least two radio fixed parts. The redefining is by preference performed from a local exchange or a centralized operation and maintenance module.

In a preferred embodiment, changing the location area level is preceded by completely or partly reallocating the radio fixed part identities among the radio fixed parts and calculating the values of the location area levels. Preferably, the radio fixed parts that have a changed radio fixed part identity are informed of the change.

The cordless communications network has to be informed of the redefined location area configuration. This may be done by storing the redefined location area configuration in a location area configuration data base, which may be maintained in the local exchange or in the centralized operation and maintenance module. In the latter case a copy of the data base may be stored in the local exchange, which copy thus has to be periodically updated.

The location area management scheme and arrangement according to the invention reduces the problems with high network load as described above by dynamically redefining the location area configuration. Consequently, when increasing the size of the location areas the number of location updates and authentications is decreased.

An advantage of the invention is that it is simple and straightforward to implement.

A further advantage of the invention is that it is straightforward to introduce new fixed parts and radio fixed parts in the network as the invention allows for a complete reallocation of the radio fixed part identities among the radio fixed parts.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF EMBODIMENTS

Figure 1:
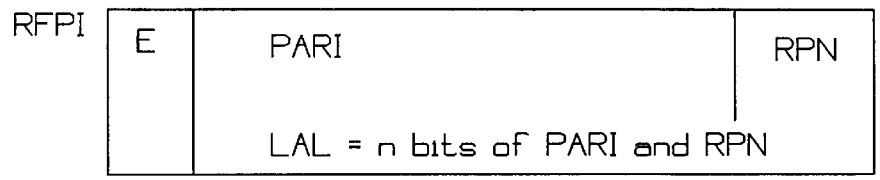
FIG. 1 shows schematically a radio fixed part identity together with a location area level indicating the size of a location area according to prior art.

In FIG. 1 is shown the structure of a radio fixed part identity RFPI. It comprises different fields such as a primary access right identity PARI field and a radio fixed part number RPN, the former being identical for all radio fixed parts belonging to the same fixed part and the latter being used for identifying radio fixed parts within the fixed part.

The primary access right identity PARI field contains 31 bits and the radio fixed part number RPN contains 8 bits for the access right classes B–D specified in the European Telecommunication Standard "Radio Equipment and Systems (RES); Digital European Cordless Telecommunications (DECT); Common Interface (CI); Part 6: Identities and addressing", which classes are intended to be used in complex private installations or for public use.

The radio fixed part identity comprises also a one-bit E field, which indicates if there are any secondary access right identities available.

The primary and secondary access right identities are broadcast from the radio fixed parts to activated portable parts located in the respective coverage area of the radio fixed parts. A portable part is allowed to access a radio fixed part only if one of the primary or secondary access right identities of the radio fixed part can be identified by any portable access right key PARK of the portable part.

The radio fixed part identity RFPI comprises further a location area level LAL, which is specified as n bits of the primary access right identity PARI and radio fixed part number RPN. A location area is defined as the coverage area of all radio fixed parts having a location area level of n bits and all n bits being identical. By default the location area level is set to the same number of bits as the primary access right identity PARI and hence a location area will cover the area of one fixed part.

When a subscriber crosses a border between a first and a second location area in direction towards the second location area with his portable part activated the portable part notices that the radio fixed part identity received in the second location area has n bits that are not identical with the n bits from the first location area or that the location area level LAL has a different value. The portable part has then to perform a location update and occasionally also an authentication.

This signaling in terms of location updates and authentications may be extensive in a crowded environment, e.g., in areas with a lot of roaming subscribers where there are multiple fixed parts not very far from each other and each of them corresponding to one location area. Each location update and authentication procedure may correspond to several messages between a portable part and a local exchange via a fixed part.

In other areas there are so few roaming subscribers with portable parts that the signaling load due to paging, i.e., searching a portable part within a location area at a terminating call, is higher than the signaling due to roaming, i.e., location updates and authentications.

These situations may vary in time and geography due to the dynamic behavior of the subscribers and consequently giving an increase of network load.

The purpose of the invention is to reduce the network load in terms of authentications and location updates in a crowded environment and likely also in terms of paging in a low traffic environment. This is achieved by a location area management scheme and arrangement, which in an adaptable way redefines new location areas, e.g., with multiple fixed parts, when initiated by the service provider or when the signaling situation of the cordless network changes in a predetermined way, e.g., when the number of location updates per unit time and unit area exceeds a predetermined value.

The scheme and arrangement according to the present invention comprises associating each of the radio fixed parts with a radio fixed part identity in such a way that at least to a certain degree neighboring radio fixed parts will have radio fixed part identities with consecutive numbers and redefining the location area configuration of the cordless communications network by changing the location area level to a different level in at least two radio fixed parts. The redefining is by preference performed from a local exchange or a centralized operation and maintenance module, e.g., based on a UNIX platform.

The cordless communications network has to be informed of the redefined location area configuration. This is preferably done by storing the redefined location area configuration in a data base.

Figure 2:
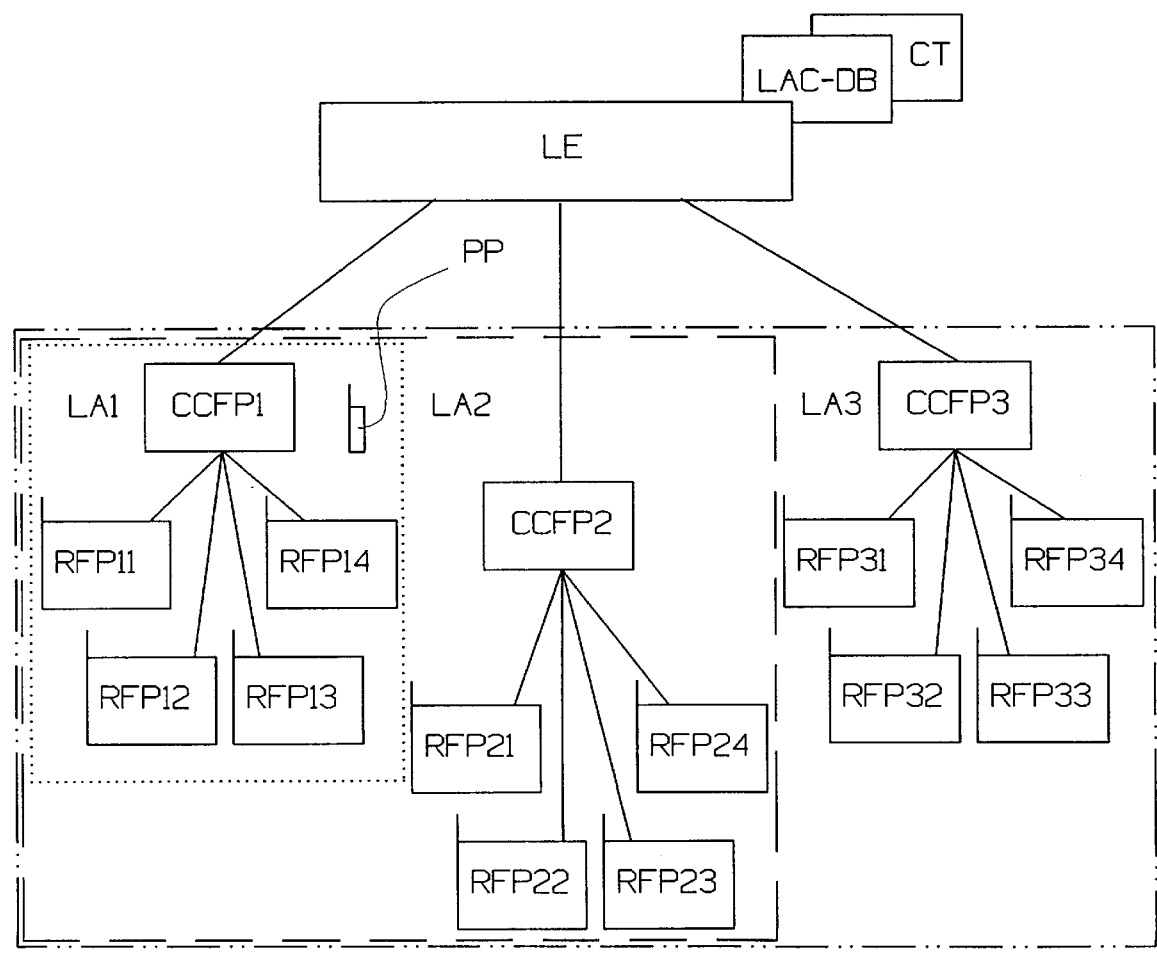
FIG. 2 shows an example of different arrangements of a location area according to the present invention.

In FIG. 2 is shown an example of different arrangements of a cordless network in terms of the size of its first location area LA1, LA2, LA3 according to the present invention. The network comprises a local exchange LE and three fixed parts. Each of the fixed parts comprises one central control fixed part CCFP1, CCFP2, CCFP3 and four radio fixed parts RFP11, RFP12, RFP13, RFP14, RFP21, RFP22, RFP23, RFP24, RFP31, RFP32, RFP33, and RFP34. To each of the radio fixed parts is assigned a radio fixed part identity, which consist of 31 bits of primary access right identity PARI and 8 bits of radio fixed part number RPN, in such a way that neighboring radio fixed parts have consecutive RPN's and neighboring fixed parts have consecutive PARI's. In table 1 is shown what PARI's and RPN's the different radio fixed parts RFP's and fixed parts FP's have (bits being denoted by x are undefined but should be the same for all radio fixed parts in the example).

If now a first location area LA1 is defined as the coverage area of the radio fixed parts RFP11, RFP12, RFP13 and RFP14, i.e., of the fixed part FP1, the location area levels of these radio fixed parts RFP11, RFP12, RFP13 and RFP14 have to be equal to 31 bits as is the default value. In FIG. 2 is indicated the size of the first location area LA1 by dotted lines.

Each radio fixed part number RPN consists of 8 bits and hence a maximum of 255 radio fixed parts may be defined within one fixed part ($2^8=256$, but the RPN of only zeros is reserved for other purposes). In FIG. 2 only four radio fixed parts are defined and consequently the location area levels LAL's may be set to 37 leaving just $(39-37)^2=4$ radio fixed parts to form the first location area LA1.

In this case with only four radio fixed parts RFP11, RFP12, RFP13 and RFP14 defined as part of the fixed part FP1 and defining the first location area LA1 the location area levels LAL's may actually be set to any figure from 31 to 37.

TABLE 1

| FP | RFP | PARI | RPN |
|---|---|---|---|
| FP1 | RFP11 | x . . . x100 | xxxxx100 |
|  | RFP12 |  | xxxxx101 |
|  | RFP13 |  | xxxxx110 |
|  | RFP14 |  | xxxxx111 |
| FP2 | RFP21 | x . . . x101 | xxxxx100 |
|  | RFP22 |  | xxxxx101 |
|  | RFP23 |  | xxxxx110 |
|  | RFP24 |  | xxxxx111 |
| FP3 | RFP31 | x . . . x110 | xxxxx100 |
|  | RFP32 |  | xxxxx101 |
|  | RFP33 |  | xxxxx110 |
|  | RFP34 |  | xxxxx111 |

Suppose now that there are a lot of subscribers roaming from the first location area LA1 to a second location area in which the radio fixed parts RFP21, RFP22, RFP23, RFP24 are located. Then, according to the present invention, the location area levels may be adjusted to lower values, thus redefining the first location area to be larger. For instance, lowering the location area levels LAL's to 30 gives a first location area LA2 covering the area of the fixed parts FP1 and FP2. Lowering the location area levels LAL's to 29 gives a first location area LA3 to cover the area of three fixed parts FP1, FP2 and FP3. In FIG. 2 is indicated the size of LA2 by dashed lines and of LA3 by dash-dotted lines.

Theoretically, four different fixed parts may defined when having location area levels LAL's of 29 ($(31-29)^2=4$). The missing radio fixed parts should have PARI's with the value x . . . x111. If only three fixed parts are to define the first location area LA3 the PARI x . . . x111 has to be blocked or denoted as a dummy variable, hence preventing other radio fixed parts from using it. Notice that all radio fixed parts belonging to the same location area should have the same location area level.

Figure 3A:
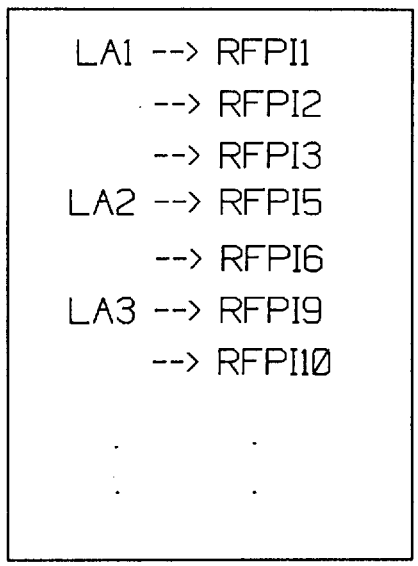
FIG. 3a shows a location area configuration data base according to the invention.

The redefining may preferably be initiated in the network's local exchange LE. The network should be updated of the new location area configuration. Preferably, the actual location area configuration is stored in a location area configuration data base LAC-DB in the network, of which an example is shown in FIG. 3a.

This example described above shows how one or more fixed parts may be defined under one location area. Of course, there may be drawbacks with too large location areas. Whenever there will be a terminating call to the portable part PP located inside this large location area LA3, the local exchange has to poll all the fixed parts FP1, FP2 and FP3 in the location area LA3 when paging the portable part PP.

This means that under certain circumstances the increase in network load due to paging is higher than the increase due to roaming. In such an environment it is desirable to make the location areas smaller by raising the location area levels LAL's of some radio fixed parts. In theory, the location area levels LAL's could be raised to 39, i.e., to such a high level that each radio fixed part defines an individual location area. In practice, however, very high values of the location area levels LAL's would not be reasonable.

In the following four different implementation schemes are to be described more in detail.

Alternative 1: Redefining location area levels in a centralized operation and maintenance module.

Alternative 2: Reallocating radio fixed part identities, calculating and redefining location area levels, and storing the redefined location area configuration in a data base in a local exchange.

Alternative 3: Reallocating radio fixed part identities, calculating and redefining location area levels in a centralized operation and maintenance module and storing the redefined location area configuration in a data base in a local exchange.

Alternative 4: Reallocating radio fixed part identities, calculating and redefining location area levels, and storing the redefined location area configuration in a centralized operation and maintenance module. A copy of the data base is maintained in a local exchange.

Alternative 1

It is assumed that the service provider will design its network in such a way that there will be no need for redefining the radio fixed part identities among the radio fixed parts. The radio fixed parts that will belong to a particular location area have consecutive PARI's and RPN's and the fixed parts that will belong to a particular location area have consecutive PARI's. In this way just by defining the location area levels of the radio fixed parts, the location areas can be defined, and no redefinition of radio fixed part identities is needed. The number of fixed parts per location area should be expressed in the form $2^n$, where n is any positive integer.

Here is an example to clarify the assumptions. For instance, fixed parts having radio fixed part identities (all in binary numbers) of 1000 and 1100 cannot be defined to be within the same location area unless all the fixed parts having radio fixed part identities 1001 to 1011 also belong to the same location area. Also, if fixed parts have location area levels of 29, a maximum of four may be defined within the same location area and their radio fixed part identities must be of the form x . . . x00, x . . . x01, x . . . x10 and x . . . x11.

Figure 4:
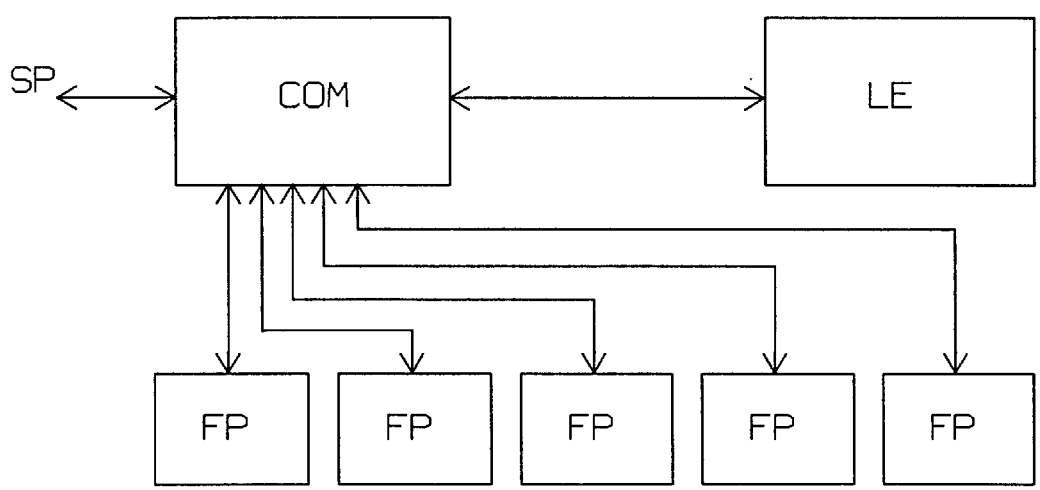
FIG. 4 shows schematically a DECT structure in which communication paths to and from a centralized operation and maintenance COM module are indicated as used by a preferred embodiment of the present invention.

The flexible location area management scheme will be initiated in a centralized operation and maintenance COM module based on, e.g., a general purpose computer or a UNIX platform by, e.g., some MML (Man Machine Language) commands. Different communication paths between the centralized operation and maintenance COM module and different fixed parts FP's and a local exchange are indicated in FIG. 4. The flexible location area management scheme may preferably be completed during a physical configuration of the fixed parts FP's. The location areas can also be defined when the traffic has started, but the flexibility of defining them may be limited.

The centralized operation and maintenance COM module will receive input from the service provider SP and do error checks, such as logical and format checks. Depending on the radio fixed part identities of the fixed parts FP's the command may be accepted or rejected by the COM module. Once the command has been accepted the COM module will calculate the new location area level values from the radio fixed part identities. The COM module will then update the local exchange LE with the new location area configuration, after which the fixed parts FP's with changed location area levels are informed.

It will also be possible to define one or more location areas under one fixed part FP. There is, however, little need for such an arrangement today. In the future there might be "super fixed parts", each containing a lot of radio fixed parts. Then it would be interesting to define multiple location areas within a fixed part and reduce the domain in which to page a portable part in case of a terminating call.

Alternative 2

This alternative will provide the features of alternative 1 and moreover an increased flexibility in defining location areas. The service provider will be able to assign any number of fixed parts for a location area. There will be no restriction on introducing new fixed parts to a location area, or defining a new location area, while the system is in operation. In this alternative the intelligence and the data about the location areas is kept in the local exchange providing the extra flexibility in defining location areas.

In this alternative the COM module will act as a tool to pass the MML commands to the local exchange. After successful execution of the command the COM module will fetch the radio fixed part identities and the location area levels that are needed to be updated. It will update the radio fixed parts with this information.

Once the command comes to the local exchange four different procedures are available.

1. Analyzing radio fixed part identities
2. Redefining radio fixed part identities
3. Calculating location area levels
4. Informing network and radio fixed parts The first procedure to perform is to analyze the radio fixed part identities to find out if the new location area configuration is realized without redefining some radio fixed part identities.

Figure 3B:
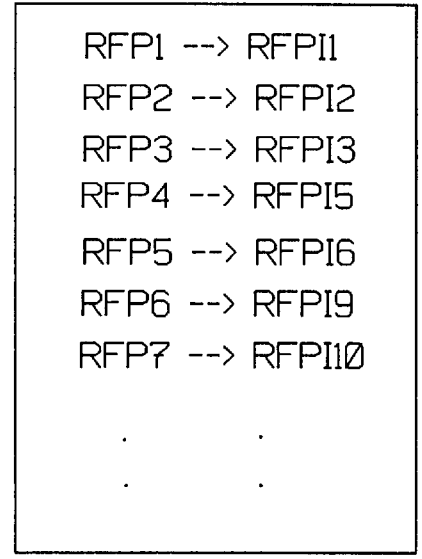
FIG. 3b shows a configuration table in which the relationship between radio fixed parts and radio fixed part identities is stored.

Physical radio fixed part numbers, which the service provider gives in the command, have to be converted into logical numbers, i.e., radio fixed part identities by referring to a conversion table CT which is maintained in the local change. An example of such a conversion table CT is shown in FIG. 3b. It is checked whether the number of radio fixed parts or fixed parts can be expressed in the form $2^n$, where n is a positive integer. It will be checked if there is any missing radio fixed part identity in a sequence (for instance, in the sequence {01, 10, 11}00 is missing. The validity of the definition of the new location area with the given sets of radio fixed parts or fixed parts is checked. For example, if {FP1, FP2} is defined as one location area and the user wants to define {FP2, FP3} as another location area this will not be accepted. The system may suggest to have {FP1, FP2, FP3} as one location area.

If it is found to be necessary to redefine the radio fixed part identities of any radio fixed parts or fixed parts the second procedure is to take place. This procedure calculates the new radio fixed part identities so that the service provider will have the flexibility to define any set of physical radio fixed parts or fixed parts in one location area, i.e., to add or delete physical radio fixed parts or fixed parts from a location area. This may be done when the network is in operation without affecting the traffic of the radio fixed parts or fixed parts that are not involved.

If the number of fixed parts cannot be expressed in the form $2^n$ (where n is an integer) it will define some dummy logical fixed part to satisfy that, if necessary. There are other situations when it may be needed to define dummy fixed parts when there is no corresponding physical fixed part or if the service provider wants to exclude the next fixed part in the sequence in the location area under consideration.

If the radio fixed part identity of the fixed parts are scattered radio fixed part identities will be defined in a sequential way. For example, if the physical names of the fixed parts in the location area are {FP1, FP2, FP3, FP5} the radio fixed part identity of fixed part FP5 is redefined in such a way that FP1, FP2, FP3 and FP5 will have consecutive radio fixed part identities (assuming that the fixed parts FP1, FP2 and FP3 have consecutive radio fixed part identities from the beginning).

As the redefinition may affect the traffic at those radio fixed parts involved there might be a warning if the number of radio fixed parts involved exceed a certain level, e.g., 50% of the total number of radio fixed parts in the network.

The third procedure will calculate the location area levels depending on how many radio fixed parts or fixed parts that are to be included in a location area. If for example all radio fixed parts belonging to n fixed parts are to define one location area the LAL's of all these radio fixed parts are set to the truncated value of $(31 - \log_2 n)$.

In the fourth procedure all fixed parts that have a new location area level and/or a new radio fixed part identity are updated of this. The network is informed of the new location area configuration by updating the location area configuration data base LAC-DB, which is stored in the local exchange. The new relationship between physical radio fixed part numbers and radio fixed part identities are stored in the conversion table CT, which may be part of the location area configuration data base LAC-DB.

Alternative 3

This alternative is exactly as the last alternative except that the four procedures are to be performed in a centralized operation and maintenance COM module e.g., based on a UNIX platform. The data about the location area configuration will still be maintained in the location area configuration data base LAC-DB in the local exchange. This alternative will demand more interactions between the COM module and the local exchange.

Alternative 4

This implementation scheme is exactly as alternative 3 except that not only the procedures are to be performed in the COM module but also the location area configuration data are to be maintained in the COM module in addition to the data base LAC-DB in the local exchange. The interaction between the COM module and the local exchange will be less than in alternative 3. The data base LAC-DB in the local exchange has to be updated periodically, e.g. using an audit function.

The flexible location area management scheme and arrangement according to the present invention reduces the signaling load in the network by dynamically adjusting the sizes of the location areas. When the size of a location area is increased the signaling due to location updates and authentications is decreased and when the size of a location area is decreased the signaling due to paging is decreased.

The invention may be implemented in an arbitrary cordless communications network, i.e., not only in a DECT network.

Advantages of the invention include simpleness in the implementation and possibilities for a complete reallocation of the radio fixed part identities among the radio fixed parts, thus also allowing new fixed parts and radio fixed parts to be introduced in the network.

The invention being thus described, it will be obvious that the same may be varied in a plurality of ways. Such variations are not to be regarded as a departure from the scope of the invention. All such modifications as would be obvious to one skilled in the art are intended to be included within the scope of the following claims.

What is claimed is:

1. A flexible location area management scheme for the reducing of signaling in a cordless communications network, which network comprises central control fixed parts (CCFP), each interconnected to radio fixed parts (RFP), particularly in a DECT (Digital Enhanced Cordless Telecommunications) based PSTN/CTM (Public Switched Telephone Network/Cordless Terminal Mobility) network characterized by the steps of associating each of the radio fixed parts (RFP) with a radio fixed part identity (RFPI) in such a way that at least to a certain degree neighboring radio fixed parts (RFP) will have radio fixed part identities (RFPI) with consecutive numbers (x . . . x00, x . . . x01, x . . . x10, x . . . x11), defining a location area configuration of the cordless communications network by assigning a location area level (LAL) to each radio fixed part (RFP), and redefining the location area configuration of the cordless communications network by changing the location area level (LAL) to a different level in at least two radio fixed parts (RFP).

2. A flexible location area management scheme as claimed in claim 1, characterized by performing the step of redefining in case of the signaling situation of the cordless communications network changing in a predetermined way.

3. A flexible location area management scheme as claimed in claim 1, characterized by performing the step of redefining from a centralized operation and maintenance (COM) module.

4. A flexible location area management scheme as claimed in claim 1, characterized by performing the step of redefining from a local exchange (LE).

5. A flexible location area management scheme as claimed in claim 1, characterized by changing the location area level (LAL) in several radio fixed parts (RFP) to such a low level that the corresponding location area (LA) covers the domain of several fixed parts (FP).

6. A flexible location area management scheme as claimed in claim 5, characterized by performing the step of changing in case of the number of location updates per unit time and unit area exceeding a predetermined value.

7. A flexible location area management scheme as claimed in claim 1, characterized by changing the location area level (LAL) in at least two radio fixed parts (RFP) to such a high level that the corresponding location area or location areas (LA) cover only a subset of the domain of a fixed part (FP).

8. A flexible location area management scheme as claimed in claim 7, characterized by performing the step of changing in case of the number of location updates per unit time and unit area falling below a predetermined value.

9. A flexible location area management scheme as claimed in claim 1, characterized by updating the cordless communications network of the redefined location area configuration.

10. A flexible location area management scheme as claimed in claim 1, characterized by that the step of changing the location area level (LAL) to a different level is preceded by
   reallocating the radio fixed part identities (RFPI) among the radio fixed parts (RFP) and
   calculating a new value of the location area level (LAL) for each radio fixed part.

11. A flexible location area management scheme as claimed in claim 10, characterized by initiating a radio fixed part identity (RFPI) update of at least all radio fixed parts (RFP) that have a changed radio fixed part identity (RFPI).

12. A flexible location area management scheme as claimed in claim 11, characterized by performing the steps of reallocating, calculating and initiating in a centralized operation and maintenance (COM) module, particularly in one based on a UNIX-platform.

13. A flexible location area management scheme as claimed in claim 11, characterized by performing the steps of reallocating, calculating and initiating in a local exchange (LE).

14. A flexible location area management scheme as claimed in claim 1, characterized by storing the redefined location area configuration in a location area configuration data base (LAC-DB).

15. A flexible location area management scheme as claimed in claim 14, characterized by maintaining the location area configuration data base (LAC-DB) in the local exchange (LE).

16. A flexible location area management scheme as claimed in claim 14, characterized by maintaining the location area configuration data base (LAC-DB) in the centralized operation and maintenance (COM) module.

17. A flexible location area management scheme as claimed in claim 16, characterized by maintaining a copy of the location area configuration data base (LAC-DB) in the local exchange (LE) and periodically updating said copy.

18. A location area management arrangement for the reducing of signaling in a cordless communications network, which network comprises central control fixed parts (CCFP), each interconnected to radio fixed parts (RFP), particularly in a DECT (Digital Enhanced Cordless Telecommunications) based PSTN/CTM (Public Switched Telephone Network/Cordless Terminal Mobility) network characterized in that it comprises means for
   associating each of the radio fixed parts (RFP) with a radio fixed part identity (RFPI) in such a way that at least to a certain degree neighboring radio fixed parts (RFP) will have radio fixed part identities (RFPI) with consecutive numbers (x . . . x00, x . . . x01, x . . . x10, x . . . x11),
   defining a location area configuration of the cordless communications network by assigning a location area level (LAL) to each radio fixed part (RFP), and
   redefining the location area configuration of the cordless communications network by changing the location area level (LAL) to a different level in at least two radio fixed parts (RFP).

19. A location area management arrangement as claimed in claim 18, characterized in that it comprises means for performing the step of redefining in case of the signaling situation of the cordless communications network changing in a predetermined way.

20. A location area management arrangement as claimed in claim 18, characterized in that it comprises means for updating the cordless communications network of the redefined location area configuration.

21. A location area management arrangement as claimed in claim 18, characterized in that it comprises means for
   reallocating the radio fixed part identities (RFPI) among the radio fixed parts (RFP) and
   calculating a new value of the location area level (LAL) for each radio fixed part.

* * * * *